(12) United States Patent
Zhang et al.

(10) Patent No.: US 8,774,182 B2
(45) Date of Patent: Jul. 8, 2014

(54) MEDIA ACCESS CONTROL DATA PLANE SYSTEM AND METHOD FOR WIRELESS COMMUNICATION NETWORKS

(75) Inventors: Hang Zhang, Nepean (CA); Mo-Han Fong, L'Original (CA); Peiying Zhu, Kanata (CA); Jianglei Ma, Kanata (CA); Wen Tong, Ottawa (CA)

(73) Assignee: Apple Inc., Cupertino, CA (US)

( * ) Notice: Subject to any disclaimer, the term of this patent is extended or adjusted under 35 U.S.C. 154(b) by 1009 days.

(21) Appl. No.: 12/092,808

(22) PCT Filed: Nov. 10, 2006

(86) PCT No.: PCT/CA2006/001844
§ 371 (c)(1),
(2), (4) Date: May 6, 2008

(87) PCT Pub. No.: WO2007/053950
PCT Pub. Date: May 18, 2007

(65) Prior Publication Data
US 2008/0285501 A1 Nov. 20, 2008

Related U.S. Application Data

(60) Provisional application No. 60/735,766, filed on Nov. 12, 2005, provisional application No. 60/735,779, filed on Nov. 12, 2005.

(51) Int. Cl.
*H04L 12/28* (2006.01)
*H04L 29/06* (2006.01)
*H04L 12/56* (2006.01)
*H04L 12/70* (2013.01)

(52) U.S. Cl.
CPC ........ *H04L 29/0653* (2013.01); *H04L 49/3009* (2013.01); *H04L 2012/5638* (2013.01)
USPC ................ 370/392; 455/7; 709/230; 709/243

(58) Field of Classification Search
None
See application file for complete search history.

(56) References Cited

U.S. PATENT DOCUMENTS 6,055,429 A 4/2000 Lynch
7,006,526 B1 * 2/2006 Biederman .................. 370/466

(Continued)

FOREIGN PATENT DOCUMENTS

EP 999717 A2 * 5/2000
EP 0999717 A2 5/2000

(Continued)

OTHER PUBLICATIONS

Zeng et al., IEEE Computer Society, Proceedings of the Second Annual International Conference on Mobile and Ubiquitous Systems: Networking and Service 2005, "A Relay Based MAC Protocol to Support Multi-Rate Feature in Mobile Ad Hoc Networks". (Jul. 17-25, 2005), pp. 145-154.

(Continued)

*Primary Examiner* — Khoa Huynh
(74) *Attorney, Agent, or Firm* — Meyertons, Hood, Kivlin, Kowert & Goetzel, P.C.

(57) ABSTRACT

A method and system for using a communication network having a relay node to provide wireless communication with a mobile station. A protocol stack is implemented in the relay node in which the protocol stack includes a media access control layer defining a media access control protocol. The media access control protocol defines a set of headers providing media access control layer data plane functions in the relay node.

39 Claims, 12 Drawing Sheets

| Name | Length (bit) | Description |
|---|---|---|
| Routing method | 2 | 00: CID based<br>01: Full BS control routing<br>10: Routing by both BS and RN<br>11: reserved |
| Fragmentation/ packaging indicator | 1 | 0: fragmentation<br>1: packing |
| CID inclusion indicator | 1 | 1: CID sub-header included |
| Packet QoS parameter indicator | 1 | 1: QoS sub-header included |
| Number of forwarding RN/reserved | 3 | For Routing method =01, Indicates the number of RN nodes in the forwarding path and there are Number of forwarding RN occurences of Route sub-headers<br>For Routing method = 10, this field is set to 1<br>For other cases, reserved |

(56) References Cited

U.S. PATENT DOCUMENTS

| | | |
|---|---|---|
| 2003/0063607 A1* | 4/2003 | Adachi et al. ............... 370/389 |
| 2003/0179742 A1 | 9/2003 | Ogier et al. |
| 2004/0081151 A1* | 4/2004 | Greis et al. ................. 370/392 |
| 2004/0095907 A1 | 5/2004 | Agee et al. |
| 2004/0114566 A1 | 6/2004 | Lim et al. |
| 2004/0147223 A1 | 7/2004 | Cho |
| 2004/0190527 A1* | 9/2004 | Okura et al. ............ 370/395.21 |
| 2005/0094588 A1 | 5/2005 | Wentink |
| 2005/0141593 A1 | 6/2005 | Pasanen et al. |
| 2005/0220052 A1 | 10/2005 | Uehara et al. |
| 2006/0141929 A1 | 6/2006 | Lockie et al. |
| 2007/0014252 A1 | 1/2007 | Chung et al. |
| 2007/0071035 A1* | 3/2007 | Evans et al. ................. 370/474 |
| 2007/0076684 A1 | 4/2007 | Lee et al. |
| 2007/0081507 A1 | 4/2007 | Koo et al. |

FOREIGN PATENT DOCUMENTS

| | | |
|---|---|---|
| EP | 1206071 A2 | 5/2002 |
| WO | 98/39936 | 9/1998 |
| WO | 01/47181 A2 | 6/2001 |
| WO | 02/087168 A2 | 10/2002 |
| WO | 03/84146 | 10/2003 |

OTHER PUBLICATIONS

International Search Report in related Application No. PCT/CA2006/001842, Feb. 21, 2007, pp. 1-4.

Final Office Action in related U.S. Appl. No. 12/092,797, Aug. 9, 2011, pp. 1-17.

Non-Final Office Action in related U.S. Appl. No. 12/092,797, Mar. 15, 2011, pp. 1-10.

* cited by examiner

| | |
|---|---|
| CID indicator | 1 bit; CID R-MAC sub-header present |
| Fragmentation indicator | 1 bit; R-fragmentation sub-header appears |
| If (Fragmentation indictor = 1) { | |
| Fragmentation control} | 2 bits - '00'= no frag; '01'= first frag; 10= last frag; 11= middle frag |
| Else { | |
| Reserved} | 2 bits |
| Reserved | 4 bits |

FIG. 14

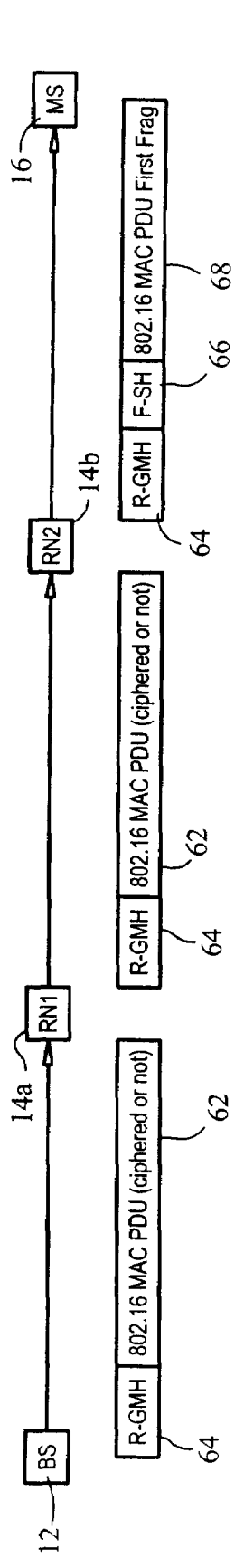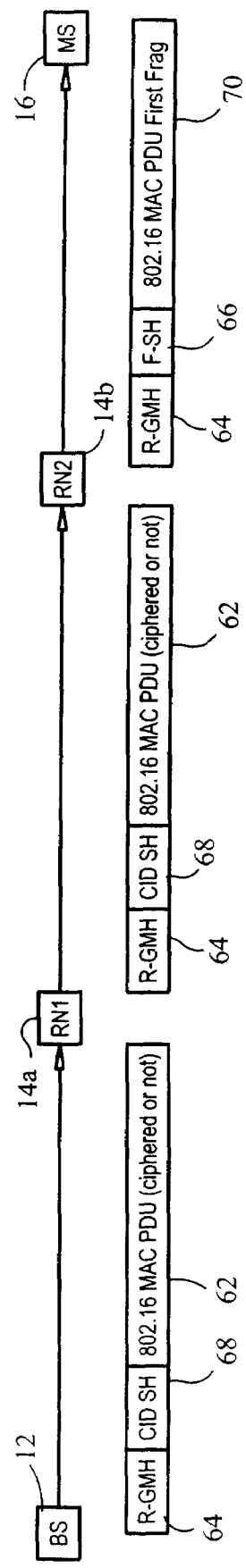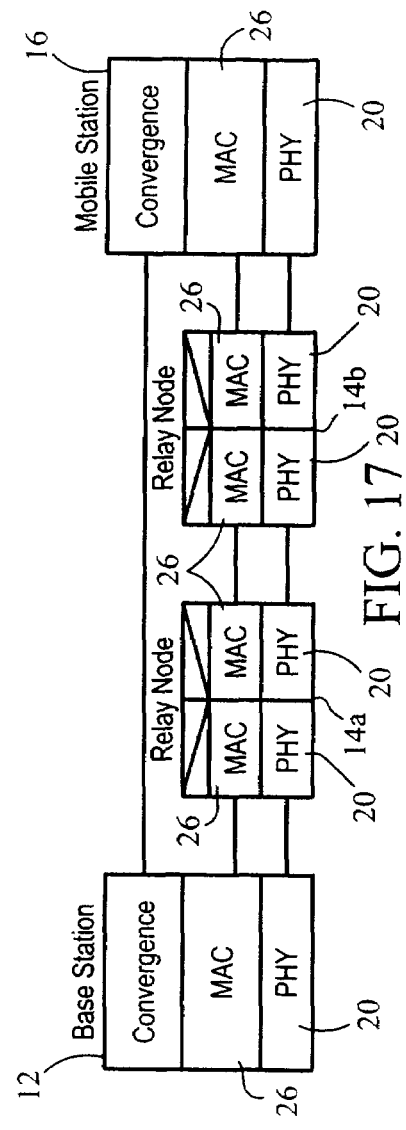

| Name | Length (bit) | Description |
|---|---|---|
| Routing method | 2 | 00: CID based<br>01: Full BS control routing<br>10: Routing by both BS and RN<br>11: reserved |
| Fragmentation/ packaging indicator | 1 | 0: fragmentation<br>1: packing |
| CID inclusion indicator | 1 | 1: CID sub-header included |
| Packet QoS parameter indicator | 1 | 1: QoS sub-header included |
| Number of forwarding RN/reserved | 3 | For Routing method =01, Indicates the number of RN nodes in the forwarding path and there are Number of forwarding RN occurences of Route sub-headers<br>For Routing method = 10, this field is set to 1<br>For other cases, reserved |

FIG. 20

| Name | Length (bits) | Description |
|---|---|---|
| HT | 1 | Header type |
| EC | 1 | Encryption control<br>If set 1: Payload is encrypted |
| Type | 6 | Bit #5 (MSB), if set to 1: Mesh SH present<br>Bit #4, if set to 1: ARQ feedback payload present<br>Bit #3, if set to 1: Indicatoion of fragmentation or packing sub-header is extended<br>Bit #2, if set to 1: Fragmentation sub-header present<br>Bit #1, if set to 1: Packing sub-header present<br>Bit #0, if set to 1: FAST_FEEDBACK allocation sub-header present |
| ESF | 1 | 1=Extended subheader(s) present |
| CI | 1 | 1=CRC is included |
| EKS | 2 | Encryption Key Sequence |
| LEN | 11 | The length in bytes of MAC PDU |
| QoS | 8 | Connection identifier |
| Destination Node ID | 8 | |
| HCS | 8 | Header Check Sequence |

| Name | Length (bit) | Description |
| --- | --- | --- |
| Routing method indicator | 1 | 1 = source node fully controlled<br>0 = distributed controlled |
| Number of RN node IDs | 7 | |
| RN node IDs | Number of RN node IDs x 8 | |

| Name | Length (bit) | Description |
| --- | --- | --- |
| Fragmentation/ packaging indicator | 1 | 0 = No fragmentation<br>1 = F-SH present |
| reserved | 7 | |

MEDIA ACCESS CONTROL DATA PLANE SYSTEM AND METHOD FOR WIRELESS COMMUNICATION NETWORKS

CROSS-REFERENCE TO RELATED APPLICATIONS

This application is a Submission Under 35 U.S.C. §371 for U.S. National Stage Patent Application of International Application Number: PCT/CA2006/001844, filed 10 Nov. 2006, entitled MEDIA ACCESS CONTROL DATA PLANE SYSTEM AND METHOD FOR WIRELESS COMMUNICATION NETWORKS, which is related to and claims priority to U.S. Patent Application Ser. No. 60/735,766, filed 12 Nov. 2005, and U.S. Patent Application Ser. No. 60/735,779, filed Nov. 12, 2005, the entirety of all of which are incorporated herein by reference.

BACKGROUND OF THE INVENTION

1. Statement of the Technical Field

The present invention relates to the field of wireless communications and more particularly to a method and system for providing a media access control ("MAC") layer data plane for wireless multi-hop networks.

2. Description of the Related Art

As the demand for high speed broadband networking over wireless communication links increases, so too does the demand for different types of networks that can accommodate high speed wireless networking. For example, the deployment of IEEE 802.11 wireless networks in homes and business to create Internet access "hot spots" has become prevalent in today's society. However, these IEEE 802.11-based networks are limited in bandwidth as well as distance. For example, maximum typical throughput from a user device to a wireless access point is 54 MB/sec. at a range of only a hundred meters or so. In contrast, while wireless range can be extend through other technologies such as cellular technology, data throughput using current cellular technologies is limited to a few MB/sec. Put simply, as the distance from the base station increase, the need for higher transmission power increases and the maximum data rate typically decreases. As a result, there is a need to support high speed wireless connectivity beyond a short distance such as within a home or office.

As a result of the demand for longer range wireless networking, the IEEE 802.16 standard was developed. The IEEE 802.16 standard is often referred to as WiMAX or less commonly as WirelessMAN or the Air Interface Standard. This standard provides a specification for fixed broadband wireless metropolitan access networks ("MAN"s) that use a point-to-multipoint architecture. Such communications can be implemented, for example, using orthogonal frequency division multiplexing ("OFDM") communication. OFDM communication uses a spread spectrum technique distributes the data over a large number of carriers that are spaced apart at precise frequencies. This spacing provides the "orthogonality" that prevents the demodulators from seeing frequencies other than their own.

The 802.16 standard supports high bit rates in both uploading to and downloading from a base station up to a distance of 30 miles to handle such services as VoIP, IP connectivity and other voice and data formats. Expected data throughput for a typical WiMAX network is 45 MBits/sec. per channel. The 802.16e standard defines a media access control ("MAC") layer that supports multiple physical layer specifications customized for the frequency band of use and their associated regulations. However, the 802.16e standard does not provide support for multi-hop networks.

802.16 networks, such as 802.16j, networks can be deployed as multi-hop networks from the subscriber equipment to the carrier base station. In other words, in multi-hop networks, the subscriber device can communicate with the base station directly or through an intermediate device.

The complexity involved in supporting multi-hop networks in a robust manner necessarily involves sophisticated MAC layer data plane protocols. Such protocols do not exist. For example, as noted above, the IEEE 802.16e standard does not support multi-hop networks. The IEEE 802.16j standard for supporting multi-hop networks has been proposed, but the standard currently makes no provision for MAC layer data plane support. It is therefore desirable to have method and system that provides MAC data plane functions to support wireless multi-hop relay networks, including but not limited to those operating in accordance with the IEEE 802.16 standards.

SUMMARY OF THE INVENTION

In accordance with one aspect, the present invention provides a method for using a communication network having a relay node to provide wireless communication with a mobile station. A protocol stack is implemented in the relay node in which the protocol stack includes a media access control layer defining a media access control protocol. The media access control protocol defines a set of headers providing media access control layer data plane functions in the relay node In accordance with another aspect, the present invention provides a system for wirelessly communicating with a mobile station in which the system has a relay node. The relay node includes a protocol stack. The protocol stack has a media access control layer defining a media access control protocol. The media access control protocol defines a set of headers providing media access control layer data plane functions in the relay node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 14 is a block diagram of an R-MAC header constructed in accordance with the principles of the present invention that supports fragmentation;

FIG. 15 is a diagram of an example of the relay node process and use of the R-MAC format in the case where a CID sub-header is not used;

FIG. 16 is a diagram of an example of the relay node process and use of the R-MAC format in the case where a CID sub-header is used;

FIG. 17 is a block diagram of yet another exemplary protocol stack constructed in accordance with the principles of the present invention;

FIG. 20 is a diagram of an arrangement of a mesh generic MAC header constructed in accordance with the principles of the present invention;

FIG. 22 is a diagram of an arrangement of an enhanced MAC header constructed in accordance with the principles of the present invention;

FIG. 23 is a diagram of an arrangement of an enhanced MAC formatted mesh sub-header constructed in accordance with the principles of the present invention; and FIG. 24 is a diagram of an arrangement an M-MAC header constructed in accordance with the principles of the present invention.

DETAILED DESCRIPTION OF THE PREFERRED EMBODIMENTS

As an initial matter, reference may be made herein to "data plane" and "control plane." In general, the control plane includes configured or signaled information that determines the overall behavior, mappings, resource allocation and forwarding parameters that can be applied to all connection frames or frames of a service class. Such information is typically established and used to set up the network devices before any payload traffic is transmitted. Data plane refers to the frame processing functions that typically take place in real-time on a frame-by-frame basis.

In accordance with embodiments of the invention various MAC data plane embodiments for use in wireless networks using relays are described. While certain embodiments are discussed in the context of wireless networks operating in accordance with the IEEE 802.16 broadband wireless standard, which is hereby incorporated by reference, the invention is not limited in this regard and may be applicable to other broadband networks including those operating in accordance with other OFDM orthogonal frequency division ("OFDM")-based systems including the 3rd Generation Partnership Project ("3GPP") and 3GPP2 evolutions. Similarly, the present invention is not limited solely to OFDM-based systems and can be implemented in accordance with other system technologies, e.g., CDMA.

Figure 1:
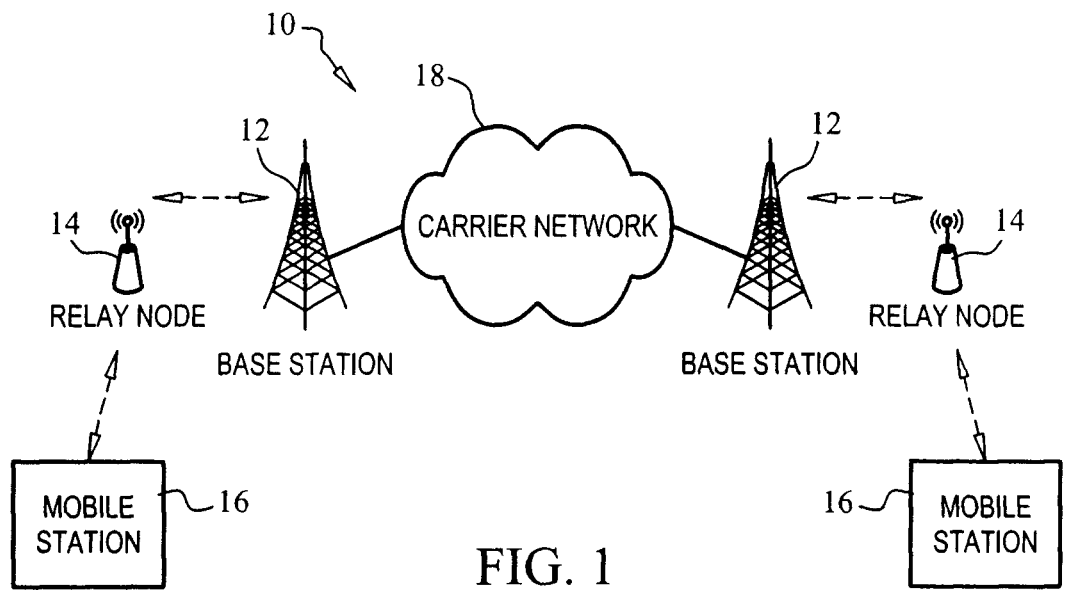
FIG. 1 is a diagram of an embodiment of a system constructed in accordance with the principles of the present invention.

Referring now to the drawing figures in which like reference designators refer to like elements, there is shown in FIG. 1, a system constructed in accordance with the principles of the present invention and designated generally as "10." System 10 includes base stations 12, relay nodes 14 and mobile stations 16. Base stations 12 communicate with one another and with external networks, such as the Internet (not shown), via carrier network 18. Base stations 12 engage in wireless communication with relay nodes 14 and/or mobile stations 16. Similarly, mobile stations 16 engage in wireless communication with relay nodes 14 and/or base stations 12.

Base station 12 can be any base station arranged to wirelessly communicate with relay nodes 14 and/or mobile stations 16. Base stations 12 include the hardware and software used to implement the functions described herein to support the MAC data plane functions. Base stations 12 include a central processing unit, transmitter, receiver, I/O devices and storage such as volatile and nonvolatile memory as may be needed to implement the functions described herein.

Mobile stations 16 can be any mobile station including but not limited to a computing device equipped for wireless communication, cell phone, wireless personal digital assistant ("PDA") and the like. Mobile stations 16 also include the hardware and software suitable to support MAC data plane functions for engaging in wireless communication with base station 12 either directly or via a relay node 14. Such hardware can include a receiver, transmitter, central processing unit, storage in the form of volatile and nonvolatile memory, input/output devices, etc.

Relay node 14 is used to facilitate wireless communication between mobile station and base station 12 in the uplink (mobile station 16 to base station 12) and/or the downlink (base station 12 to mobile station 16). A relay node 14 configured in accordance with the principles of the present invention includes a central processing unit, storage in the form of volatile and/or nonvolatile memory, transmitter, receiver, input/output devices and the like. Relay node 14 also includes software to implement the MAC data plane functions described herein. Of note, the arrangement shown in FIG. 1 is general in nature and specific exemplary arrangements of MAC data plane communication embodiments constructed in accordance with the principles of the present invention are described below. Of note, according to an embodiment, base stations 12 and relay nodes 14 implemented in accordance with the principles of the present invention are fixed, i.e. non-moving devices, but the invention is not limited to such. It is contemplated that these devices may move. Mobile stations 16 can be fixed, stationary or moving. Although not shown, it is contemplated that a communication path from base station 12 to mobile station 16 can traverse multiple relay nodes 14.

The data plane aspects of the MAC enhancement are referred to herein as "R-MAC". As is discussed below in detail, a set of MAC packet data unit ("PDU") formats communication between relay node 14 and base station 12 to support MAC data plane functions are implemented in accordance with the present invention.

The present invention provides data plane packet, routing and transmission arrangements for wireless communication networks using relay nodes 14. A first embodiment in the case of relay nodes arranged in a hierarchical arrangement in which it is assumed that transmissions will make one or two relay node 14 hops is described. In another embodiment, MAC data plane arrangements for wireless communication networks using relays arranged in a mesh is described.

MAC Data Plane Design for One or Two Hop Non-Mesh Relay Networks

In accordance with this embodiment, it is assumed that connections from mobile stations 16 to base stations 12 are made on an end-to-end basis, i.e., the connection is not terminated and/or instituted at relay nodes 14. Further, it is assumed that there is a convergence sub layer, and that connection maintenance and ARQ are implemented on an end-to-end basis. As used herein, the term "end-to-end" refers to the data plane connection between mobile station 16 and base station 12. It is also assumed that relay nodes 14 are used to enhance the coverage and installation throughput between mobile station 16 and base station 12.

Initially, it is noted that the particular data plane embodiment depends on the desired MAC layer functions that can be implemented in relay nodes 14. For example, the full set of MAC layer functions include convergence, connection maintenance, security, scheduling, i.e. quality of service ("QoS"), ARQ, and routing. Various embodiments, i.e., scenarios are implemented in relay nodes 14 based on the subset of MAC functions selected from this full set of functions. For example, three scenarios (from the MAC data plane point of view) are provided in accordance with embodiments of the present invention. In accordance with a first scenario, relay nodes 14 provide no additional processing beyond receiving and relaying data. In this first scenario, base stations 12 provide the convergence, connection (in the form of a connection identifier), ARQ, security, routing and scheduling functions, and mobile stations 16 provide the complementary convergence, connection, ARQ and security functions.

In a second scenario, relay nodes 14 provide routing and scheduling functions, while base stations 12 and mobile stations 16 provide the same functions as described above with respect to the first scenario. In accordance with a third scenario, relay nodes 14 provide routing, scheduling and security (encryption) functions, while base stations 12 and mobile stations 16 provide the same functions described above with respect to the first scenario. Each of these three scenarios is described in detail.

First Scenario

Figure 2:
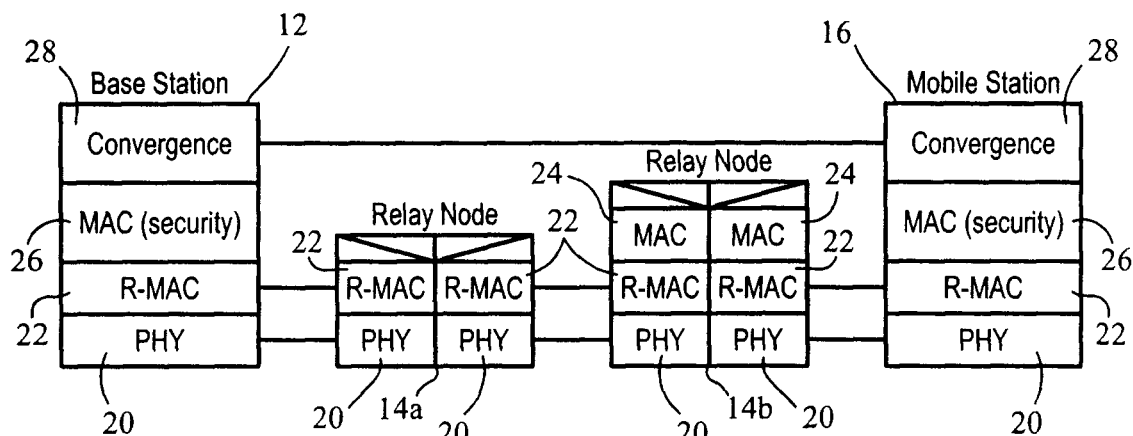
FIG. 2 is a block diagram of an exemplary protocol stack constructed in accordance with the principles of the present invention.

The first scenario is explained with reference to the protocol stack diagram in FIG. 2. As noted above, routing and scheduling are controlled by base station 12. Re-fragmentation can be performed at a relay node 14 for transmission between relay node 14 and mobile stations 16. As is shown in FIG. 2, the present scenario assumes a transmission passed between base station 12 and mobile station 16, and provides two relay nodes, namely relay nodes 14a and relay node 14b in the path. Of note, relay nodes 14a and 14b are referred to collectively herein as relay node 14. As such, the diagram in FIG. 2 shows a relay node hop between base station 12 and mobile station 16. As is seen in FIG. 2, the first scenario includes a MAC layer for facilitating relay data plane functions (defined and described herein as the "R-MAC" layer). It is this R-MAC layer that provides scheduling and routing control as well as fragmentation.

As is seen in FIG. 2, security at the MAC layer is performed on an end-to-end basis. Relay nodes 14 include physical layer 20 and R-MAC layer 22. Relay nodes directly communicating with mobile stations 16, e.g., relay node 14b, also includes a MAC 24 header process for transmission to mobile station 16. In such case, MAC layer 24 is used for re-fragmentation, and not necessarily for control, i.e. relay node 14b need not support scheduling as this is done by base station 12 in this first scenario. As noted above, base station 12 and mobile station 16 include a MAC layer 26 which does provide scheduling and security, as well as convergence layer 28. Arrangements for providing physical layer 20, MAC layer 26 and convergence layer 28 are known in the art and are not explained herein.

Figure 3:
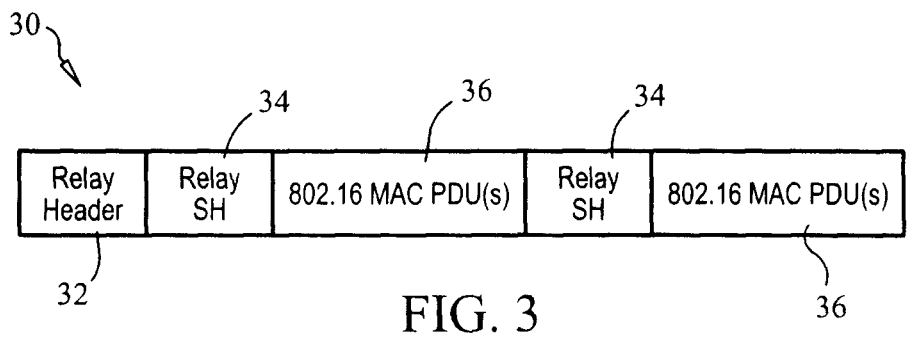
FIG. 3 is a diagram of an exemplary packet data unit format for an R-MAC constructed in accordance with the principles of the present invention.
Figure 4:
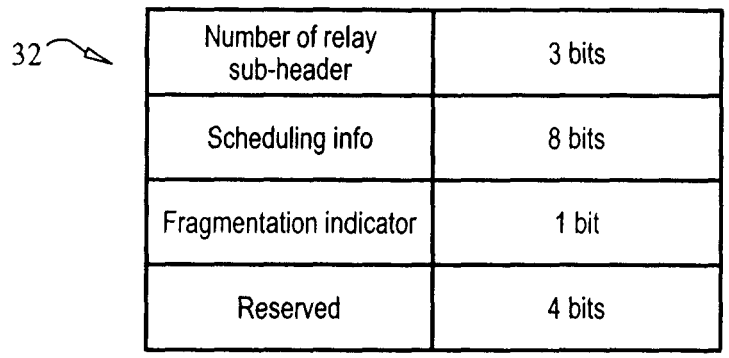
FIG. 4 is a diagram of an exemplary MAC relay header constructed in accordance with the principles of the present invention.

As is shown in FIG. 2, base station 12, relay nodes 14 and mobile station 16 include the R-MAC data plane layer. An exemplary packet data unit ("PDU") format for an R-MAC constructed in accordance with the present scenario is described with reference to FIG. 3. PDU 30 includes relay header 32, relay sub-header ("SH") 34 and IEEE 802.16 MAC PDUs 36. It is understood that the present invention is not limited to IEEE 802.16 MAC PDUs. It is contemplated that the present invention can support any MAC PDU. R-PDU 30 allows PDUs for multiple terminals to be included in MAC PDU 36. This arrangement advantageously saves overhead by not requiring the repetition of generic MAC header 32 or relay SH 34. This arrangement provides an R-MAC PDU supporting multiple MAC PDUs for communication from base station 12 to relay node 14. MAC PDUs 36 may or may not be encrypted. An example of the generic R-MAC header 32 is shown in FIG. 4, and the generic R-MAC header is referred to as "R-GMH". R-GMH 32 includes a 3-bit field indicating the number of relay sub-headers 34 that follow, and an 8-bit field including scheduling information such as a region ID and other information used by relay nodes 14 to provide resource scheduling so the relay node 14 can transmit the packet to the next hop. R-GMH 32 also includes a single bit fragmentation indicator used to indicate whether or not the MAC PDU 36 is fragmented. In accordance with the example shown in FIG. 4, 4 bits are reserved for future use. Of note, the header shown in FIG. 4 as well as any other packet format arrangements described herein are not limited solely to the field length and specific field shown. It is contemplated that fewer or larger field sizes can be used, based on the needs of the system. Further, it is contemplated that the fields need not be provided within the header in the order shown. In accordance with this first scenario, the MAC PDU 36 format is maintained on an end-to-end basis.

Figure 5:
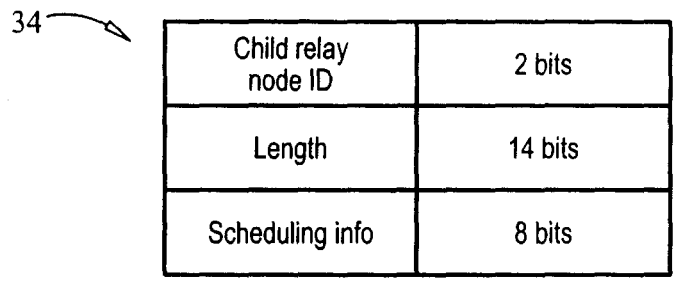
FIG. 5 is a diagram of an exemplary relay sub-header constructed in accordance with the principles of the present invention.

An example of an arrangement for relay sub-header 34 is shown in FIG. 5. Relay sub-header 34 includes 2-bit field for identifying the node ID for the child relay 14 to which the PDU 36 is destined or forwarded, a 14-bit length field indicating the length of the PDU 36 that immediately follows relay sub-header 34 as well as an 8-bit scheduling information field.

Figure 6:
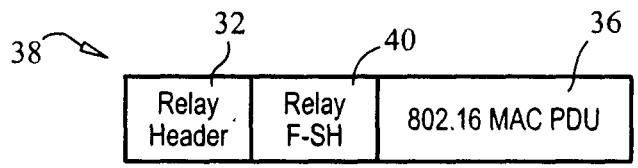
FIG. 6 is a diagram of an exemplary R-MAC packet data unit having a fragmented MAC packet data unit constructed in accordance with the principles of the present invention.

As mentioned above, the present scenario supports R-MAC PDUs that include fragmented MAC PDUs. An exemplary R-MAC PDU with a fragmented MAC PDU is shown in FIG. 6. In such a case, R-MAC PDU 38 includes the relay header 32, a fragmented relay sub-header ("F-SH") 40 and MAC PDU 36, which in the case of FIG. 6, includes encrypted or non-encrypted fragmented data. An exemplary arrangement of a relay F-SH is described in reference to FIG. 7. Relay F-SH 40 includes 2-bit fragmentation control ("FC") field, a 3-bit fragment sequence number ("FSN") field and an 11-bit field indicating the length of the payload, i.e. the length of the MAC PDU 36. The 2-bit fragmentation control field can include values indicating whether the fragment in MAC PDU 36 is the first part, a middle part, or last part. Further, fragmentation control bits can also indicate that MAC PDU 36 is not fragmented.

In operation, base station 12 maintains a routing table including the downlink CID and corresponding route, i.e. which relay node 14 to send the packet to. Base station 12 creates an R-MAC PDU such as PDU 30 by packing multiple MAC PDUs 36 and pending relay header 32 and relay sub-header 34. R-MAC PDU 30 is then transmitted to relay node 14, e.g., relay node 14a.

Relay node 14 receives R-MAC PDU 30 from base station 12 or its parent relay node 14a. For example, relay node 14b is in communication with relay node 14a and would therefore receive header 32 from relay node 14a. Relay node 14b processes the R-MAC PDU and selects the MAC PDU 36 to be relayed by it based on the header 32 and relay sub-header 34. In the case where the MAC PDU 36 is to be further relayed to another node, relay node 14 creates a new R-MAC PDU 30 and transmits the same to the next relay node 14. For example, relay 14a can create a new R-MAC PDU 30 and transmit the same to relay node 14b. In the case where the relay node 14 is one hop away from mobile station 16, e.g., relay node 14b creates a new R-MAC PDU, optionally with fragmentation, such as R-MAC PDU 38, and transmits R-MAC PDU 38 to mobile station 16 using the transmission resources of relay node 14b.

Second Scenario

As noted above, the second scenario provides data plane functions within relay node 14 such as routing and scheduling. The second arrangement adds functionality to relay nodes 14 at the potential expense of additional overhead. However, as discussed below in detail, the present invention contemplates the implementation of certain functions, described below, to minimize the additional overhead to the extent practical.

The second scenario can be divided into two embodiments. The first embodiment of the second scenario provides a downlink having a MAC PDU to be relayed that is limited in its maximum size. This avoids the situation of having the last hop relay node 14 before mobile station 16 re-fragment the MAC PDU. In the second embodiment, there is no limit on the maximum size of the MAC PDU. Each is discussed.

Regarding the first embodiment in which the MAC PDU to be relayed is limited in size, this is done because the communication link from base station 12 to relay node 14 is typically better in quality than from relay node 14 to mobile station 16. If the maximum size of the MAC PDU is not limited, the PDU size for the base station 12 to relay node 14 link will typically be very large. However, once this large MAC PDU hits the last relay node 14 in the chain, that last relay node 14 must heavily process the MAC PDU to fragment it to accommodate the smaller channel capability of the wireless relay node 14 to mobile station 16 link. For example, without fragmentation, base station 16 may prepare a 1,000-byte MAC PDU for transmission to relay node 14. Because of the high quality channel associated with the stationary relay node 14, the 1,000-byte MAC PDU will not be fragmented. However, when the 1,000-byte MAC PDU arrives at the final relay node 14 in the chain, that relay node must process the 1,000-byte MAC PDU to accommodate, for example, a 500-byte size MAC PDU for transmission on the wireless channel between relay node 14 and mobile station 16. By limiting the maximum size of the MAC PDU to that smaller 500-byte size, the need to fragment the MAC PDU at the last relay node 14 is avoided.

The maximum size of the DL MAC PDU at base station 12 can be determined at the lowest delivery at a rate on all hops (if multiple hops are involved) for all served mobile stations 16. The size of the DL MAC PDU at base station 12 can also be determined based on the average link capacity availability of a mobile station 16 in a given scheduling interval. Once determined, the maximum MAC PDU upper bound is set to assure that re-fragmentation is avoided.

The first embodiment of the second scenario in which the MAC PDU is limited in size can be further sub-divided into a backward compatible design and a design that is not backward compatible with respect to existing standards and deployments. Therefore the use of a backward compatible design provides the routing and scheduling functions in relay node 14 allows for accelerated deployment.

Figure 8:
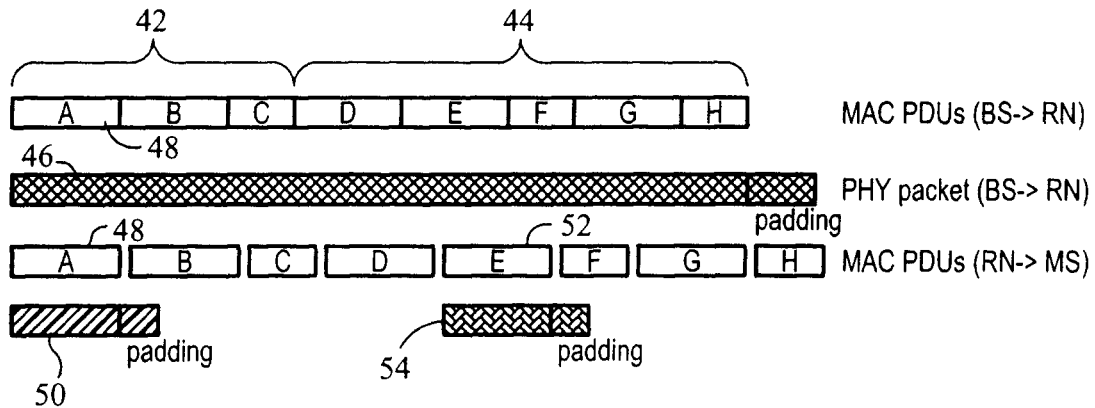
FIG. 8 is a block diagram showing packet formation in accordance with an embodiment of the invention.

The arrangement and operation of the backward compatible design is explained with reference to FIG. 8. Initially, base station 12 creates MAC PDUs. This is shown in FIG. 8 in which PDUs A, B, and C are associated with service data unit ("SDU") 42, destined for a first mobile station, and PDUs D, E, F, G, and H are part of a second group of SDU 44 that are destined for a second mobile station. Once base station 12 assembles the MAC PDUs A-H, base station 12 puts these PDUs in a physical burst 46 and transmits the burst 46 including padding if necessary, to relay node 14 (FIG. 1). Of note, although FIG. 1 shows a single relay node 14 hop, it is contemplated that, in any of the three scenarios described herein, multiple relay node 14 hops are supported.

The last relay node 14 in the chain receives the physical burst and classifies the MAC PDUs based on the CID and length fields in the MAC header to determine which mobile station 16 is the destination. Relay node 14 puts each individual MAC PDU into a physical burst, adds whatever padding may be necessary and transmits the PDU to its destination mobile station 16. For example, MAC PDU 48 is included as part of physical burst 50 and transmitted to the first mobile station while MAC PDU 52 is included as part of physical burst 54 and transmitted to the second mobile station. Similar processing is done for PDUs B-D and F-H (not shown). While backward compatible in nature with existing standards, the limitation on PDU size does create redundancy and overhead in the sense that the MAC header on the base station 12 to relay node 14 hop is transmitted more than would otherwise be necessary if MAC PDU size were not limited. This is the case because the CID, packet number ("PN"), etc., are repeated in multiple MAC PDUs, even though the PDUs are from one connection to one mobile station 16.

The second embodiment in which MAC PDU size is still limited is a non-backward compatible design in which the MAC header redundancy is suppressed. This arrangement advantageously avoids the need for re-fragmentation by limiting MAC PDU size based on the limitation methodology described above with respect to the backward-compatible design. However, in the case of the non-backward compatible design, MAC headers are suppressed to avoid redundancy and overhead both in terms of the processing that is done by relay node 14 and channel usage between base station 12 and relay node 14. In accordance with this arrangement, relay nodes 14 implement the R-MAC protocol to support the routing and scheduling functions.

Figure 9:
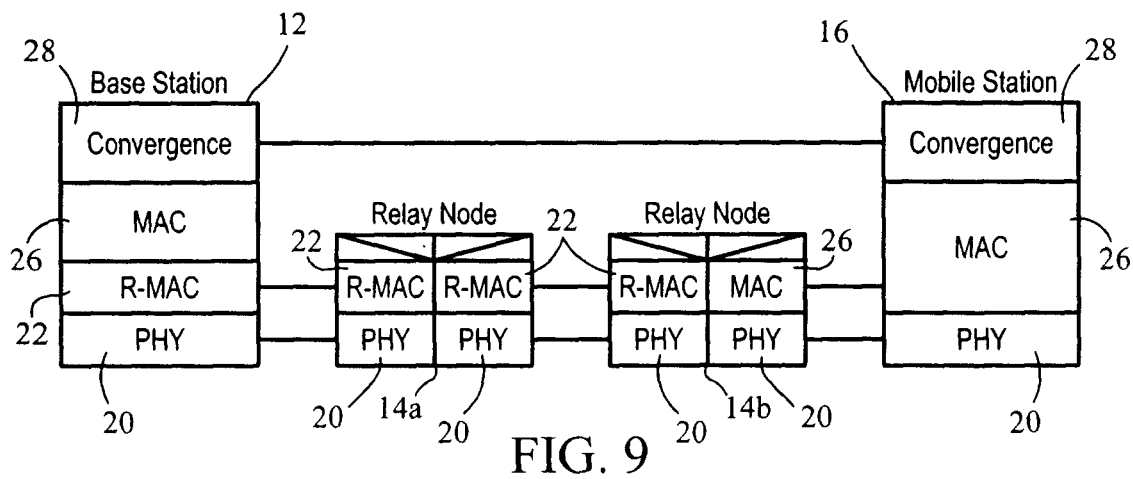
FIG. 9 is a block diagram of another exemplary protocol stack constructed in accordance with the principles of the present invention.

An exemplary protocol stack for implementing the non-backward compatible design with respect to mobile station 16 that includes size-limited MAC PDUs is described with reference to FIG. 9. As is shown, base station 12 and relay nodes 14 include an R-MAC layer that is used to provide header suppression. By way of example, relay node 14a is receiving and transmitting R-MAC PDUs while the last hop relay node, e.g., node 14b demultiplexes, the R-MAC PDU and reconstructs a normal, i.e. backward compatible, MAC PDU for transmission to mobile stations 16. Accordingly, the mobile station 16 protocol stack shown in FIG. 9 does not include the R-MAC PDU support.

An exemplary R-MAC header constructed in accordance with the principles of the present invention to support the non-backward compatible design for the second scenario is described with reference to FIG. 10. As is shown, R-MAC header 56 includes a number of different fields. Numbers in parentheses in FIG. 10 indicate the size in bits for the particular field.

R-MAC header 56 includes a 2-bit type field, 1-bit CRC indicator ("CI") field, a 2-bit encryption key sequence ("EKS") field and a field indicating the number of MAC PDUs present in the packet. R-MAC header 56 also includes an 8-bit size indicator field indicating the size for each encapsulated encrypted normal MAC payload component and an 8-bit fragment/packing indicator for each encapsulated encrypted MAC payload component. R-MAC header 56 further includes a 16-bit connection identifier field, divided into an 8-bit most significant bit and an 8-bit least significant bit field, as well as an 8-bit header check sequence ("HCS") field. Regarding the size indicator field, each bit in the 8-bit field corresponds to an encapsulated encrypted MAC payload component. If the bit is set to 1, it indicates that the payload is not set at the maximum size, and the last bit corresponds to the first encapsulated encrypted MAC payload within the 8-bit field. The 8-bit fragment packing indicator field is arranged such that each bit corresponds to an encapsulated encrypted MAC payload. If the bit is set to "1", this indicates that a fragmentation sub header is included in the encapsulated encrypted MAC payload. If the bit is set to "0", this indicates that the packing sub header is in the encrypted encapsulated MAC payload. The last bit (bit no. 7 in a 0-7 bit numbering scheme) corresponds to the first encapsulated encrypted MAC payload.

The dotted lines within the R-MAC header indicate those fields which may optionally be included. These fields include the packet number of the first encapsulated encrypted MAC payload component, ARQ feedback payload, an extended sub-header where applicable, and the length for each encapsulated encrypted normal MAC payload where the corresponding indicator, discussed above, is set at "1". Although not part of the header itself, the payload is shown for the sake of completeness as is the trailing cyclic redundancy check ("CRC") field.

Figure 10:
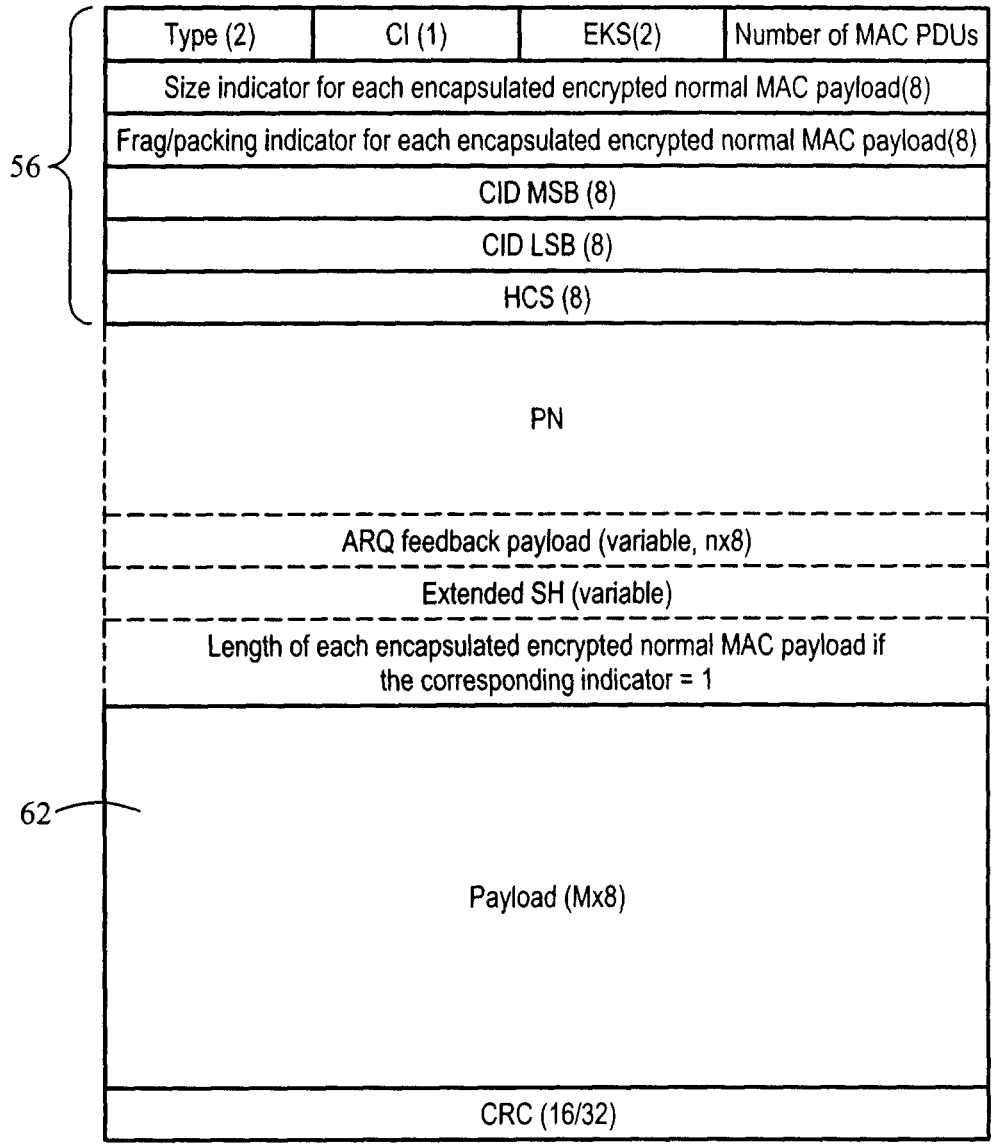
FIG. 10 is a diagram of an exemplary R-MAC header constructed in accordance with the principles of the present convention.

In operation, base station 12 processes the MAC PDUs to create an R-MAC PDU such as the R-MAC PDU shown in FIG. 10 that compresses the generic MAC header and security headers as shown in FIG. 10 and removes duplicates as well, thereby allowing multiple encrypted PDU payloads to be included within the transmitted packet shown in FIG. 10.

Figure 11:
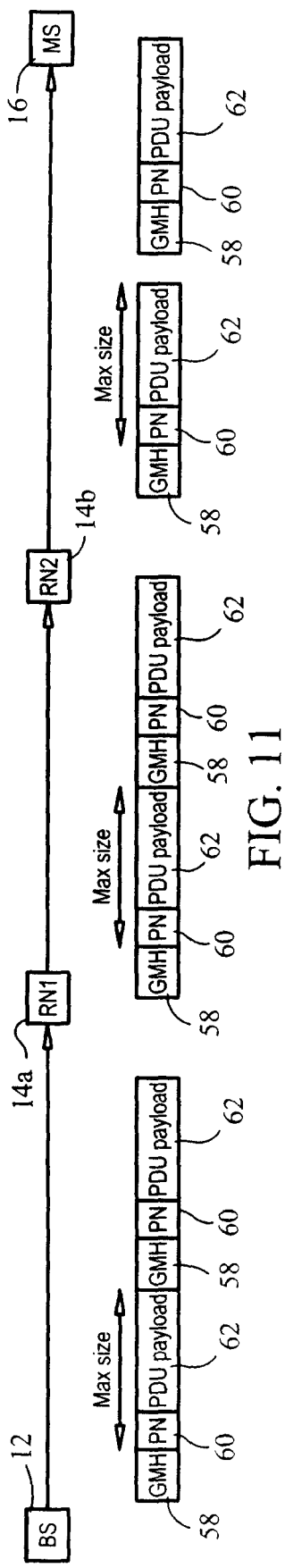
FIG. 11 is a block diagram of an example of a packet data unit having an upper bound limitation but without MAC packet data unit header redundancy suppression constructed in accordance with the principles of the present invention.

An example of this operation is explained with reference to FIGS. 11 and 12. FIG. 11 shows an example of a PDU with an upper bound limitation but without the MAC PDU header redundancy suppression. The general MAC header ("GMH") of the type described with respect to the backward compatible design as may be known in the art. For example, such a GMH would be included as part of PDU A 48 shown in FIG. 8.

Turning again to FIG. 11, it is observed that, as with the arrangement described above, no new layer is introduced because GMH 58 is followed by packet number 60 and PDU payload 62 in each burst. Accordingly, relay node 14 processes the MAC header and looks up the QoS and route table (on a CID) basis for scheduling and routing.

Figure 12:
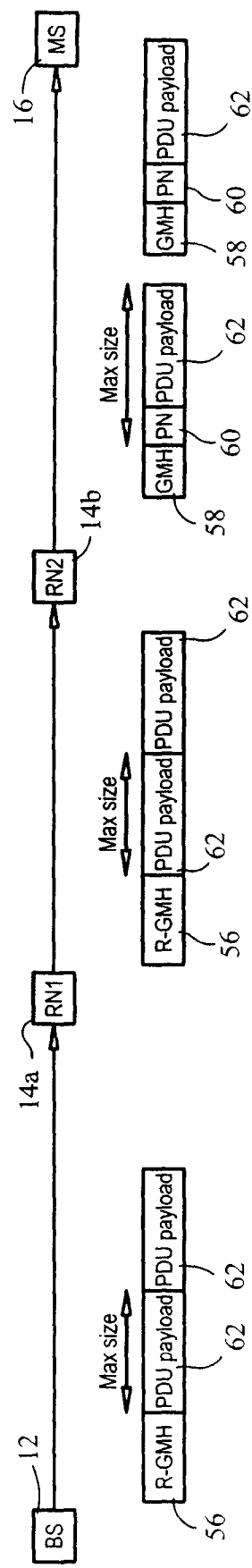
FIG. 12 is a is a block diagram of an example of a packet data unit having no upper bound size limitation and including MAC packet data unit header redundancy suppression constructed in accordance with the principles of the present invention.

In contrast, the MAC header compression and suppression in the non-backward compatible embodiment is shown in FIG. 12 in which the R-MAC header 56 (also referred to and shown in FIG. 12 as "R-GMH") is used to suppress redundancy. In this case, relay node 14 processes the R-MAC header 56 to look up the QoS and information and route table for scheduling and routing. The last hop relay node, e.g., relay node 14b, then re-creates a packet that a backward compatible mobile station 16 can process, namely, a packet that does not exceed the maximum size and includes GMH 58, PN 60 and PDU payload 62 in a non-compressed format. This arrangement is suitable to both uplink and downlink communications.

Figure 13:
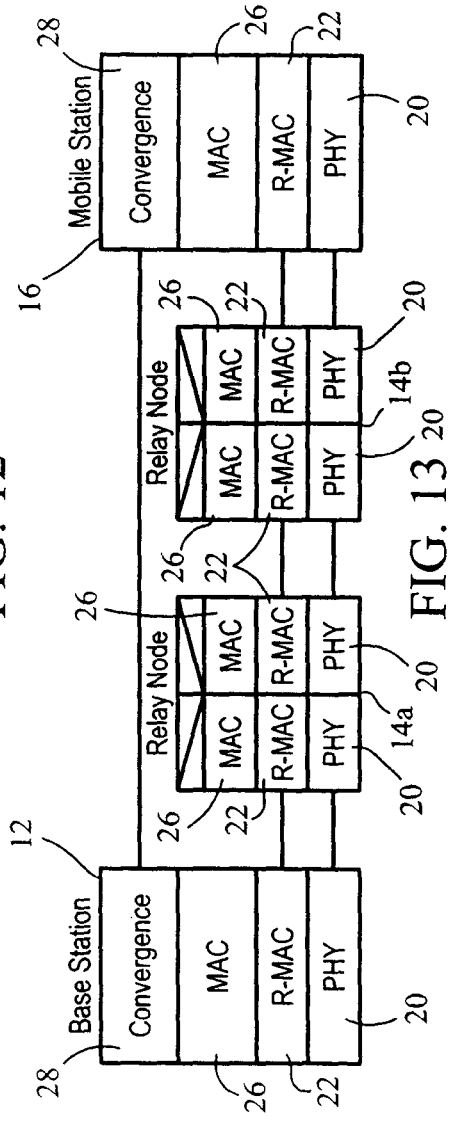
FIG. 13 is a block diagram of still another exemplary protocol stack constructed in accordance with the principles of the present invention.

Another embodiment within the second scenario in which relay node 14 performs routing and scheduling functions on the downlink is an arrangement in which the size of the MAC PDU to be relayed is not limited. An exemplary protocol stack is shown in FIG. 13. In this case, mobile station 16 includes the R-MAC layer in its protocol stack and relay nodes 14 include the ability to use the R-MAC layer to enable relay nodes 14 to re-fragment before delivering encrypted MAC PDUs to mobile station 16. Of note, uplink transmission uses the same arrangement as discussed above regarding the non-backward compatible design in which the maximum PDU size is limited An arrangement which does not limit the maximum size of the MAC PDU to be relayed advantageously avoids MAC header redundancy. However, if re-fragmentation is needed because the packet is simply too large to be transmitted from relay node 14 to mobile station 16, relay node 14b can re-fragment the MAC PDU during relay. In other words, the R-MAC used in this embodiment provides for re-fragmentation to allow relay nodes 14 to implement fragmentation and AMC and HARQ at the physical layer to optionally support partial MAC packet transmission to implement the CID-based QoS and routing function.

An exemplary R-MAC header that supports fragmentation is described with reference to FIG. 14. An R-MAC PDU format to support the embodiment described herein and shown in FIG. 13 is shown in FIG. 14 as R-GMH 64. R-GMH 64 includes a 1-bit CID indicator which establishes whether a CID R-MAC sub-header, discussed below, is present. R-GMH header 64 also includes a single bit fragmentation indicator that indicates whether a fragmentation sub-header is present (referred to as an R-fragmentation or "F-SH" sub-header). In the case where the fragmentation indicator is set, R-GMH includes a 2-bit fragmentation control field in which "00" indicates no fragmentation, "01" indicates that the PDU is a first fragmentation, a "10" indicates that the PDU includes the last fragment and a "11" indicates that the PDU includes a middle fragment. Of course, the present invention is not limited to this precise arrangement and the bits can be associated differently with respect to fragmentation component and the existence of fragmentation. R-GMH header 64 also includes fields with reserved bits for future use.

In the case where the CID indicator indicates that a CID R-MAC sub-header is present, a packet arrangement constructed in accordance with the principles of the present invention would include a 16-bit field with a CID. Similarly, where the fragmentation indicator bit indicates that an R-SH sub-header is included in the packet, a 5-bit FSN field and 11-bit payload length field are included. Accordingly, an exemplary R-MAC PDU assembled in accordance with the present invention would include an R-GMH relay header, the R-CID sub-header and the R-fragmentation sub-header, followed by the unciphered MAC PDU as transmitted by the base station 12 to relay node 14.

An example of the relay node process and use of the R-MAC format in the case where a CID sub-header is not used is described with reference to FIG. 15. As shown in FIG. 15, base station 12 transmits an R-GMH sub-header 64 and MAC PDU 62 to relay node 14a. In this case, relay node 14 a processes the R-GMH to understand the CID for route selection and QoS processing. Relay node 14a then transmits another packet having an R-GMH 64 and the MAC PDU 62 to another relay node, namely relay node 14b. Relay node 14b processes the MAC header for QoS and routing. In this case, because relay node 14b fragments the PDU, the transmission in the downlink by relay node 14b includes F-SH 66 and first fragment 68. Subsequent R-MAC transmissions include the R-GMH 64, F-SH 66 and other fragments until the entire MAC PDU has been transmitted on the DL to MS 16.

An arrangement with a CID sub-header is now explained with reference to FIG. 16. Of note, in the case where the R-MAC transmission includes a CID sub-header, e.g., CID SH 68, the relay nodes 14 in the path do not have to actually open and process the 802.16 MAC PDU 62 because the CID SH 68 includes the information that relay node 14 needs for direct look-up of the QoS profile and the routing table for scheduling and routing control. As such, base station 12 includes CID SH 68 in its transmission. Relay node 14a uses CID SH 68 to determine scheduling and routing control and transmits to relay node 14b. The operation of relay node 14b and its re-fragmentation and creation of F-SH 66 is the same as discussed above with respect to FIG. 15. As noted above, the second scenario provides routing and QoS functionality in relay nodes 14 for both of the above-described options (unlimited size MAC PDUs and PDUs with limited maximum size). In this case, each access point, i.e., base station 12 or relay node 14, maintains and stores a routing table. The routing table is created when a relay node 14 registers to a base station 12. The routing table is updated based on instructions from base station 12 when a mobile station 16 selects a relay node 14 as its access point.

It is presumed that the routing and QoS control table include fields identifying the CID that needs to be relayed, the next hop relay, the QoS profile and the number of hops to reach the destination. As such, using the CID instead of the mobile station 16 address as the entry of the routing table allows different connections to use different routes through the network. This allows, for example, a mobile station 16 to receive from both its serving base station 12 and relay node 14.

For DL data delivery, base station 12 or relay node 14 uses the routing table to determine which MAC PDUs are to be relayed by which relay node 14. The QoS profile field is used by base station 12 and relay node 14 for scheduling. With respect to UL data collection, relay node 14 simply collects MAC PDUs and delivers the collected MAC PDUs to its parent base station 12 or parent relay node 14. Of note, the next hop relay can be identified by CID number or a relay node-ID assigned to the relay node 14.

Third Scenario

In accordance with the third scenario, base stations 12 and mobile stations 26 include those features described above with respect to the first and second scenarios. In this third scenario, relay nodes 14 include scheduling, routing and security functions. The protocol stack for devices implementing the third scenario is described with reference to FIG. 17. In this case, base station 12, relay nodes 14 and mobile station 16 do not include any variation of the R-MAC PDU, header, etc., described above with respect to the first two scenarios. Instead, relay nodes 14 implement the full set of MAC data plane functions thereby obviating the need for any data plane enhancement. In this scenario, the control plane is arranged to provide enhanced routing and key delivery functionality, the latter being used with respect to encryption. The result is that the data plane is backward compatible with existing standards such as the IEEE 802.16 standard, and operation is transparent to mobile station 16.

Mac Data Plane Design For Mesh Relay Networks

Figure 18:
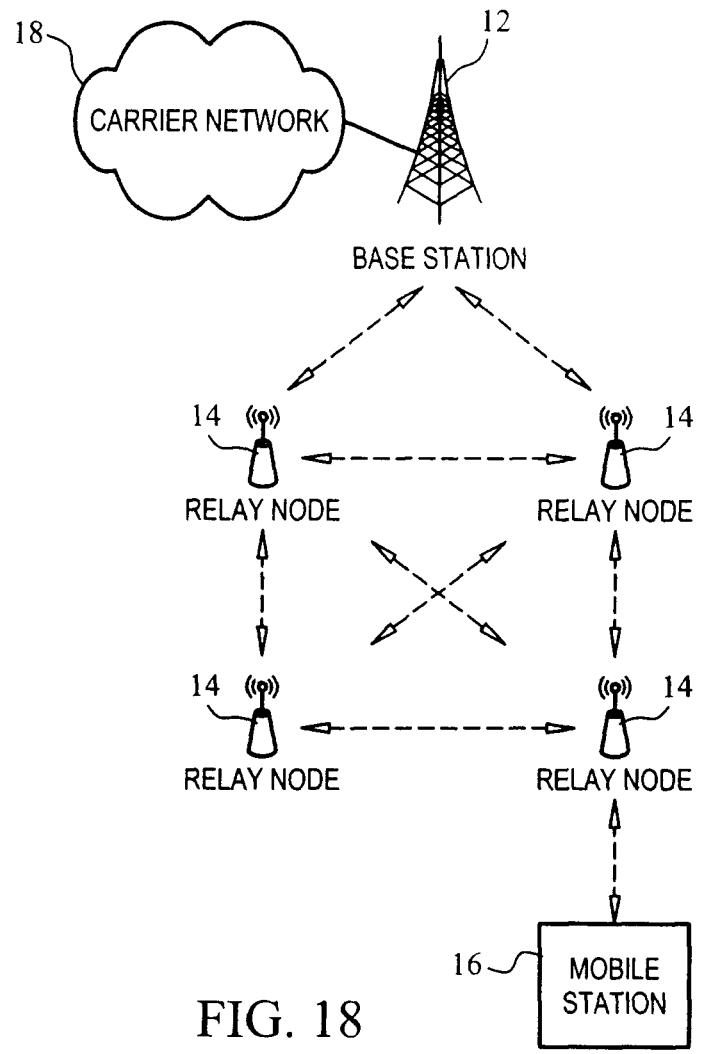
FIG. 18 is a diagram of an alternate embodiment of a system constructed in accordance with the principles of the present invention.

An exemplary arrangement for a wireless mesh relay-based network is described with reference to FIG. 18. As is shown, system 10 includes relay nodes 14 arranged in a mesh topology such that a data packet transmitted by base station 12 to mobile station 16, and vice versa, can traverse a number of different routes through relay nodes 14. Of note, although the communication arrangement shown in FIG. 18 shows a full mesh topology with a plurality of relay nodes communicating with base station 12, the present invention is not limited solely to this arrangement. It is contemplated that the relative positioning of relay nodes 14 within coverage areas supported by a base station 12 may provide less than a full-mesh connectivity topology. It is understood that the descriptions herein with respect to wireless mesh relay network in accordance with the present invention can be implemented by less than a full-mesh topology. The present invention provides four embodiments for implementing data plane support for a mesh relay network. The first embodiment is an end-to-end connection oriented arrangement using CIDs in which security is provided on an end-to-end basis. In the second embodiment, the data plane connections are provided as end-to-end connections as well using CIDs, but security is provided on a link, i.e., per hop, basis. In the third embodiment, the end-to-end connection is packet-oriented such that each packet can take a different route through the relay mesh. In the third embodiment, security is provided on an end-to-end basis. Finally, in the fourth embodiment, the end-to-end connection is packet-oriented, and security is provided on a per link basis. Each of these scenarios is described in detail below. Of note, the first and the third embodiments implement a mesh-MAC layer as part of the protocol stack ("M-MAC") and the third and fourth embodiments also provide an enhanced MAC such as an enhanced IEEE 802.16 MAC ("E-MAC"). As discussed below in detail, the E-MAC provides a modified CID field as part of the previously known IEEE 802.16 GMH. In the case of the present invention, the modified 16-bit CID field includes an 8-bit destination node and 8-bit QoS field. The source node, i.e., base station 12 node. processing, relay node 14 processing and destination processing, i.e., mobile station 16, include different processing arrangements for each embodiment. With each of the four embodiments, scheduling of packet transmission is distributed among the base station 12, relay nodes 14 and mobile station 16. Further, switching is done at the MAC layer.

First Relay Mesh Network Embodiment

Figure 19:
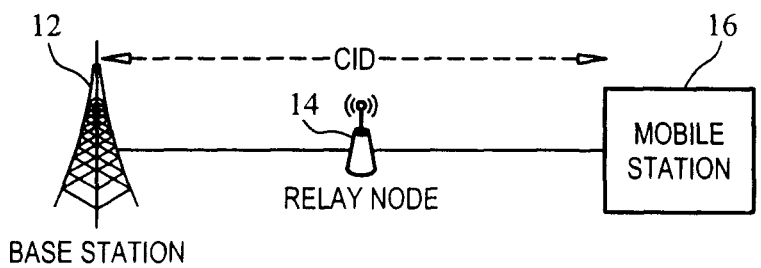
FIG. 19 is a block diagram of an exemplary system component arrangement supporting CID-based connections constructed in accordance with the principles of the present invention.

FIG. 19 shows an exemplary system component arrangement supporting the first embodiment. As is shown, the connection between base station 12 and mobile station 16 is based on an end-to-end CID. Of note, FIG. 19 is a simplified version, it being understood that the CID connection between base station 12 and mobile station 16 can traverse one or more relay nodes 14. Security in this embodiment is formed on an end-to-end basis, i.e., between base station 12 and mobile station 16. In other words, no additional protection is provided for relay traffic between base station 12 and relay node 14, between relay nodes 14 or between the last hop relay node 14 and mobile station 16.

The protocol stack supporting this first embodiment is similar to that shown in FIG. 13 with the exception that, in this embodiment, R-MAC shown in FIG. 13 is substituted by a mesh-MAC ("M-MAC") supporting data plane mesh operation and, the MAC in base station 12 and MAC in mobile station 16 include security to provide the above-noted end-to-end security. Also of note, the MAC layer in relay nodes 14 can optionally be replaced with a CID sub-header.

In accordance with the present invention, an exemplary packet format includes a header followed by optional sub-headers and then the actual payload. An M-MAC PDU constructed in accordance with the present embodiment allows the ciphered end-to-end MAC PDU, i.e., an IEEE 802.16 MAC PDU, to be packed and fragmented for more efficient channel utilization. The M-MAC PDU also allows for optional packet-based routing and QoS control by providing a route sub-header and QoS sub-header. Further, the M-MAC PDU of the present embodiment provides for the optional inclusion of the CID to obviate the need for relay nodes 14 to process the MAC header. Examples of optional CID inclusion are discussed above and are discussed in detail with respect to relay mesh networks.

The mesh generic MAC header ("M-GMH") is described with reference to FIG. 20. M-GMH 72 includes a 2-bit routing method, 1-bit fragmentation/packing indicator, 1-bit CID inclusion indicator, 1-bit packing QoS parameter indicator and a 3-bit number of forwarding relay nodes, or optionally simply reserved bits fields. The 2-bit routing method can be established, for example, such that a "00" indicates that the routing method is CID-based and no route sub-header is present. A "01" means that the base station 12 fully controls the routing and that there is some number of forwarding relay nodes 14 route sub-headers present. A "10" means that both base station 12 and relay node 14 control the routing and that at least one route sub-header is present. A "0" in the fragmentation/packing indicator fields means that fragmentation is present and a fragmentation sub-header appears following the route sub-header. A "1" in the fragmentation/packing indicator field indicates that packing is present, i.e., that more than one-MAC packing sub-header is included in the packet. "1" bits in the CID inclusion indicator and/or packing/QoS parameter indicator fields indicate the inclusion of the CID sub-header and/or QoS sub-header, respectively. Regarding the number of forwarding relay nodes field, where the routing method field is a "01", the number of forwarding relay nodes field indicates the number of relay nodes in the forwarding path and the number of forwarding relay node occurrences of route sub-headers. For the case where the routing method is a "10", the number of forwarding relay nodes field is set to all 1s.

Figure 7:
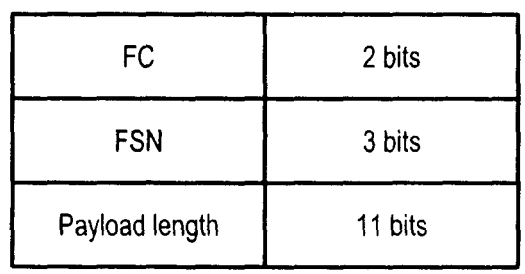
FIG. 7 is a diagram of an exemplary fragmented relay sub-header constructed in accordance with the principles of the present invention.

The M-MAC fragmentation/packing sub-header takes the same form as the fragmentation/packing sub-header 40 shown in FIG. 7. It is contemplated that the fragmentation sub-header or the first packing sub-header appears and follows the M-GMH. Where additional packing sub-headers are used, they are located just before each upper layer MAC PDU.

The M-MAC CID sub-header is a 16-bit sub-header having the CID of the encapsulated MAC PDU. The M-MAC QoS sub-header is an 8-bit sub-header corresponds to the QoS of the SDU in the M-MAC having the highest priority if a packing sub-header is present. The M-MAC route sub-header is an 8-bit field that indicates the ID of the destination relay node 14 (in the case where the routing method in the M-GMH equals "10").

With respect to QoS control in the present embodiment, for CID-based routing, i.e., the routing method field in M-GMH 72 is "00", relay node 14 maintains a CID table. For each CID entry, a list of QoS parameters is maintained. Relay node 14 then schedules transmission based on the corresponding QoS parameters. In the case where the routing method field is "01" or "10" in M-GMH 72, relay node 14 evaluates the QoS sub-header discussed above and schedules the forwarding time accordingly.

For routing control in which the routing method is CID-based, (a "00" in the M-GMH 72), relay node 14 maintains a routing table based on the CID to determine the next. If packet reassembly is needed, once reassembled, relay node 14 reads the CID and switches the MAC PDU to the corresponding outbound queue of the next relay node 14 for further forwarding.

Where the routing method is a "01" indicating full base station 12 controlled routing, no routing table is needed since the base station 12 is determining and controlling the routing. As such, for each received M-MAC PDU, the receiving relay node evaluates the M-MAC sub-header, removes the route sub-header corresponding to its own relay node ID and puts the new M-MAC PDU in the outbound queue corresponding to the relay node indicated by the next route sub-header.

In the case where the routing method indicates a "10" for routing controlled by both base station 12 and relay node 14, relay node 14 maintains a routing table having destination relay node IDs and corresponding next hop relay node IDs. For each received M-MAC PDU, relay node 14 evaluates the M-MAC route sub-header, makes packet reassembly, if needed, performs a look-up in the routing table (stored within relay node 14) and places the M-MAC PDU into the corresponding outbound queue for the next relay node 14 in the forwarding path.

Mesh Relay Second Embodiment

Referring to FIG. 19, like the first embodiment, the connection is an end-to-end CID-based connection. However, unlike the first embodiment, encryption is provided on a link, i.e., hop basis. In other words, the base station 12 to relay node 14 link is encrypted. Relay node 14 then de-encrypts and re-encrypts the traffic destined for mobile station 16. In terms of protocol stack, no special M-MAC is needed. As such, the base station 12 provides security at the MAC layer for transmission to relay node 14. Similarly, relay nodes 14 provide encryption at their MAC layer. Finally, mobile stations 16 provide for the encryption at their MAC layer.

In operation, each relay node 14 re-assembles any fragment of MAC service data unit ("SDU"). By way of distinguishing, a protocol data unit ("PDU") refers to the data format passed to the lower part, with respect to the protocol stack of the MAC to the physical layer. The service data unit ("SDU") refers to the data format received from the next higher layer. In other words, PDUs include SDU data once the SDU data has been fragmented, encrypted, etc.

Also in operation, the control plane MAP can identify a receiving relay node 14 on the forwarding path.

Mesh Relay Third Embodiment

Figure 21:
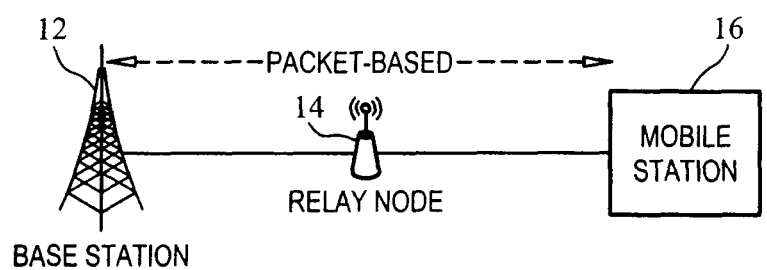
FIG. 21 is a block diagram of an exemplary system component arrangement supporting logical packet based connections communication constructed in accordance with the principles of the present invention.

In the third embodiment, security is provided on an end-to-end basis. As is shown in FIG. 21, the actual data plane connection is based on a packet-based logical end-to-end connection. In other words, a connection between base station 12 and mobile station 16 does not require that the same path through the relay node mesh be taken for each packet.

The protocol stack for this embodiment is similar to that shown in FIG. 13. However, the R-MAC stack noted in FIG. 13 is replaced by an M-MAC protocol within the stack for each of base station 12, relay nodes 14 and mobile station 16. In addition, the present embodiment provides an enhanced MAC ("E-MAC") in place of the known MAC for each of base station 12, relay nodes 14 and mobile station 16. Security between base station 12 and mobile station 16 is provided within the enhanced MAC layer of base station 12 and mobile station 16. In other words, no additional protection for relay traffic is provided between base station 12 and relay nodes 14 or relay nodes 14 and mobile station 16, other than the end-to-end security provided in the E-MAC layer.

The E-MAC provided by the present invention enables packet-based routing which will result in quicker routing than using the CID-based routing, and provides the ability to use a smaller routing table to save storage memory in base station 12, relay nodes 14 and mobile station 16. The E-MAC, as discussed below, enables packet-based QoS control. In addition, as is discussed below, the enhanced MAC provided by the present invention allows for the routing function to be fully removed from relay node 14.

An example of an enhanced MAC header, referred to herein as a ("E-GMAC") header is described with reference to FIG. 22. An E-GMAC header 74 constructed in accordance with the principles of the present invention, includes a 1-bit header type ("HT") field and 1-bit encryption control ("EC") field. The EC field is set to a 1 if the payload is encrypted. A 6-bit type field is also provided in which bit 0 indicates whether a fast_feedback allocation sub-header is present, bit 1 indicates whether a packing sub-header is present, bit 2 indicates whether a fragmentation sub-header is present, bit 3 indicates whether the fragmentation of packing sub-header is extended, bit 4 indicates whether there is ARQ feedback payload present and bit 5 indicates whether a mesh sub-header is present. The sub-headers are discussed below in detail.

E-GMAC header 74 also includes a 1-bit field indicating whether extended sub-headers are present and a 1-bit CRC indicator ("CI") field indicating whether CRC is included in the packet. A 2 bit encryption key sequence ("EKS") field is also included. E-GMAC header 74 includes an 11 bit field indicating the length in bytes of the accompanying MAC PDU, an 8-bit QoS connection identifier field, 8 bit destination node ID field, and an 8-bit header check sequence ("HCS") field.

FIG. 23 shows an example of an E-MAC formatted mesh sub-header 76 constructed in accordance with the principles of the present invention. Mesh sub-header 76 includes a 1-bit field indicating the routing method in which a "1" indicates that the routing is fully controlled by the source node and a "0" indicates that the control is distributed among base station 12 and relay nodes 14. A 7-bit field is provided to indicate the quantity of relay node IDs included in the sub-header along with the actual relay node IDs themselves. The present embodiment also provides an M-MAC for re-fragmentation purposes. FIG. 24 shows an example of an M-MAC header 78 constructed in accordance with the principles of the present invention in which a 1-bit fragmentation packing indicator is provided and 7 bits are reserved for future use. A "0" in the fragmentation/packing indicator field indicates no fragmentation and a "1" indicates that a fragmentation sub-header ('F-SH") is present. An exemplary fragmentation sub-header is shown as F-SH sub-header in FIG. 7.

By way of arrangement, and in operation, an exemplary packet includes an M-MAC header followed by an F-SH header, where needed, such as in the case of transmission from the last hop relay node 14 to mobile station 16 followed by the E-MAC PDU or PDU fragments in the case of fragmentation between relay node 14 and mobile station 16. As between base stations 12 and relay nodes 14 and between relay nodes 14 themselves, the M-MAC header is followed by the E-MAC header ("E-GMH") and, where appropriate, E-MAC mesh sub-headers.

In the case where QoS control is used, relay node 14 evaluates the QoS field in the E-MAC header and schedules a forwarding time accordingly. Regarding routing control, in the case where base station 12 maintains full routing control, no routing table is needed. For each received M-MAC PDU, i.e., encapsulated E-MAC PDU, relay node 14 evaluates the E-MAC mesh sub-header and modifies the sub-header by removing its node ID from the mesh sub-header and places the new M-MAC to the queue corresponding to the next relay node 14 in the path indicated by the next mesh sub-header.

In the case where both base station 12 and relay nodes 14 provide routing control, relay node 14 maintains a routing table, stores an entry for each destination relay node in the form of its relay node ID and corresponding next hop relay node 14 ID. For each received M-MAC PDU, relay node 14 makes whatever SDU re-assembly is needed, and evaluates the E-MAC to determine the ID of the destination relay node. The relay node 14 looks up the next hop ID in the routing table and puts the M-MAC PDU into the corresponding transmission queue of the next relay node 14 in the forwarding path.

Relay Mesh Fourth Embodiment

Referring again to FIG. 21, in accordance with this embodiment, routing from base station 12 to mobile station 16 is performed using a packet-based logical connection. However, unlike the third embodiment discussed above, security, i.e., encryption, is performed on a per-hop basis. Accordingly, with respect to the protocol stack, relay nodes 14 are arranged so that the E-MAC layer includes the security function. As such, for example, the link from base station 12 to relay node 14 is secured at the E-MAC level. With each respective hop through the mesh formed by relay nodes 14, encryption is performed. In other words, each relay node 14 decrypts the E-MAC layer encryption and re-encrypts for the successive forwarding.

As is readily apparent, the modification of the generic MAC header is the same as that described above with respect to the third scenario. In operation, each relay 14 re-assembles any fragment MAC SDU prior to re-fragmentation. Also, as discussed above with respect to the second embodiment, the identification of a receiving relay node 14 on the folding path can be broadcast in the control plane MAP.

The present invention advantageously provides an arrangement by which wireless relay nodes can be implemented in a hierarchical or mesh fashion to support the data plane connectivity used to allow base stations 12 to communicate with relay nodes 14, to allow relay nodes 14 to communicate among themselves, and to allow relay nodes 14 to efficiently communicate with mobile station 16, and vice versa at the data plane level. The present invention advantageously establishes arrangements for limiting/avoiding fragmentation, re-fragmenting packets where necessary, and establishing packet arrangements and headers that avoid the overhead associated with unnecessary and repeated header creation and transmission.

The present invention provides systems and methods for data plane communication between a base station 12 and mobile station 16 using end-to-end CID-based communications or an end-to-end communication using logically routable packet switch connections. In addition, the present invention provides for an end-to-end based encryption or encryption being performed at the link level.

The present invention advantageously provides and defines a comprehensive system and method for implementing MAC layer data plane functionality for wireless communication networks using relay nodes arranged hierarchically as well as in an mesh topology. The present invention provides a set of functions and defines novel MAC data plane messages.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. A method for using a communication network having a relay node and a base station to provide wireless communication with a mobile station, the method comprising:
    implementing, by a relay node, a media access control protocol, wherein the media access control protocol defines a set of headers, the set of headers providing media access control layer data plane functions in the relay node; and
    wherein at least one of the headers comprises a field indicating a quantity of forwarding relay nodes that are in a path from the base station to the mobile station;
    wherein at least one of the headers comprises a field indicating a routing method, wherein the routing method comprises a field indicating base station control and relay node control, or a combination of base station and relay node control of the routing; and
    wherein at least one of the headers comprises a field indicating the presence of a quality of service (QoS) sub-header.

2. The method of claim 1, wherein at least one of the headers comprises a field for scheduling.

3. The method of claim 1, wherein at least one of the headers comprises a field for routing.

4. The method of claim 1, wherein at least one of the headers comprises a field indicating the presence of fragmentation, and wherein a relay fragmentation subheader is used if the field indicates that fragmentation is present.

5. The method of claim 1, further comprising, setting, by a media access control protocol data unit ("MAC PDU") in the relay node, a maximum size of the MAC PDU to avoid re-fragmentation by the relay node.

6. The method of claim 1, wherein at least one of the headers comprises a general media header comprising a security header.

7. The method of claim 1, further comprising storing, by the relay node, a routing table, the routing table indicating a next hop relay node for a corresponding connection ID.

8. The method of claim 7, comprising storing scheduling information in the routing table, the scheduling information indicating a QoS profile for the corresponding connection ID.

9. The method of claim 1, wherein the media access control protocol is part of a protocol stack in the relay node, wherein the protocol stack supports a plurality of relay nodes arranged in at least a partial mesh configuration.

10. The method of claim 9, further comprising establishing a connection ID-based connection from the base station to the mobile station using at least one of the a plurality of relay nodes.

11. The method of claim 10, wherein at least one of the headers comprises a field indicating the presence of a connection ID sub-header.

12. The method of claim 9, wherein media access control layer security is provided on an end-to-end basis from the base station to the mobile station.

13. The method of claim 9, further comprising establishing a packet oriented logical connection from the base station to the mobile station using at least one of the a plurality of relay nodes.

14. The method of claim 13, further comprising controlling QoS on a per-packet basis.

15. The method of claim 14, wherein at least one of the headers comprises a field indicating QoS information.

16. The method of claim 13, wherein at least one of the headers comprises a field indicating a destination relay node ID of one of the forwarding relay nodes.

17. The method of claim 9, wherein media access control layer security is provided on a per communication link basis from the base station to the mobile station.

18. The method of claim 1, further comprising: storing a routing table in a protocol layer of the relay node, the routing table including a list of relay node IDs, the routing table indicating a next hop relay node ID corresponding to each entry in the list of relay node IDs.

19. The method of claim 1, wherein at least one of the headers comprises a field for a number of forwarding relay node occurrences of route sub-headers.

20. A system for wirelessly communicating between a mobile station and a base station, the system comprising:
    a relay node configured to implement a media access control protocol, wherein the media access control protocol defines a set of headers providing media access control layer data plane functions in the relay node; and
    wherein at least one of the headers comprises a field indication of a quantity of forwarding relay nodes that are in a path from the base station to a mobile station;

wherein at least one of the headers comprises a field indicating a routing method, wherein the routing method comprises a field indicating base station control and relay node control, or a combination of base station and relay node control of the routing; and wherein at least one of the headers comprises a field indicating the presence of a quality of service (QoS) subheader.

21. The system of claim 20, wherein at least one of the headers comprises a field for scheduling.

22. The system of claim 20, wherein at least one of the headers comprises a field for routing.

23. The system of claim 20, wherein at least one of the headers comprises a field indicating the presence of fragmentation, and wherein a relay fragmentation subheader is used if the field indicates that fragmentation is present.

24. The system of claim 20, wherein the relay node is further configured to implement a protocol stack comprising a media access control protocol data unit ("MAC PDU"), wherein the relay node uses a maximum size of the MAC PDU to avoid re-fragmentation.

25. The system of claim 20, wherein at least one of the headers comprises a general media header comprising a security header.

26. The system of claim 20, wherein the relay node further comprises a storage device, the storage device storing a routing table, the routing table indicating a next hop relay node for a corresponding connection ID.

27. The system of claim 26, wherein the routing table further comprises scheduling information, the scheduling information indicating a QoS profile for the corresponding connection ID.

28. The system of claim 20, wherein the relay node is further configured to implement a protocol stack, wherein the protocol stack supports a plurality of relay nodes arranged in at least a partial mesh configuration.

29. The system of claim 28, wherein the relay node is used to relay connection ID-based connection traffic from the base station to the mobile station.

30. The system of claim 29, wherein at least one of the headers comprises a field indicating the presence of a connection ID sub-header.

31. The system of claim 28, wherein media access control layer security is provided on an end-to-end basis through the relay node from the base station to the mobile station.

32. The system of claim 28, wherein the relay node is used to relay traffic based on a packet oriented logical connection from the base station to the mobile station.

33. The system of claim 32, wherein the relay node controls QoS on a per-packet basis.

34. The system of claim 33, wherein at least one of the headers comprises a field indicating QoS information used by the relay node to control QoS.

35. The system of claim 32, wherein at least one of the headers comprises a field indicating a destination relay node ID.

36. The system of claim 28 wherein media access control layer security is provided on a per communication link basis, the relay node providing media access control layer security on links coupled thereto.

37. The system of claim 28, wherein the relay node further comprises a storage device, the storage device storing a routing table, the routing table comprising a list of relay node IDs, and the routing table indicating a next hop relay node ID corresponding to each entry in the list of relay node IDs.

38. The system of claim 20, wherein at least one of the headers comprises a field for a number of forwarding relay node occurrences of route sub-headers.

39. A non-transitory computer accessible memory medium storing programming instructions executable by a processor to:

implement, on a relay node, a media access control protocol, wherein the media access control protocol defines a set of headers, the set of headers providing media access control layer data plane functions in the relay node; and wherein at least one of the headers comprises a field indicating a quantity of forwarding relay nodes that are in a path from the base station to the mobile station;

wherein at least one of the headers comprises a field indicating a routing method, wherein the routing method comprises a field indicating base station control and relay node control, or a combination of base station and relay node control of the routing; and wherein at least one of the headers comprises a field indicating the presence of a quality of service (QoS) subheader.

* * * * *